S. VAN STONE.
Stands for Flowers.
No. 165,456. Patented July 13, 1875.
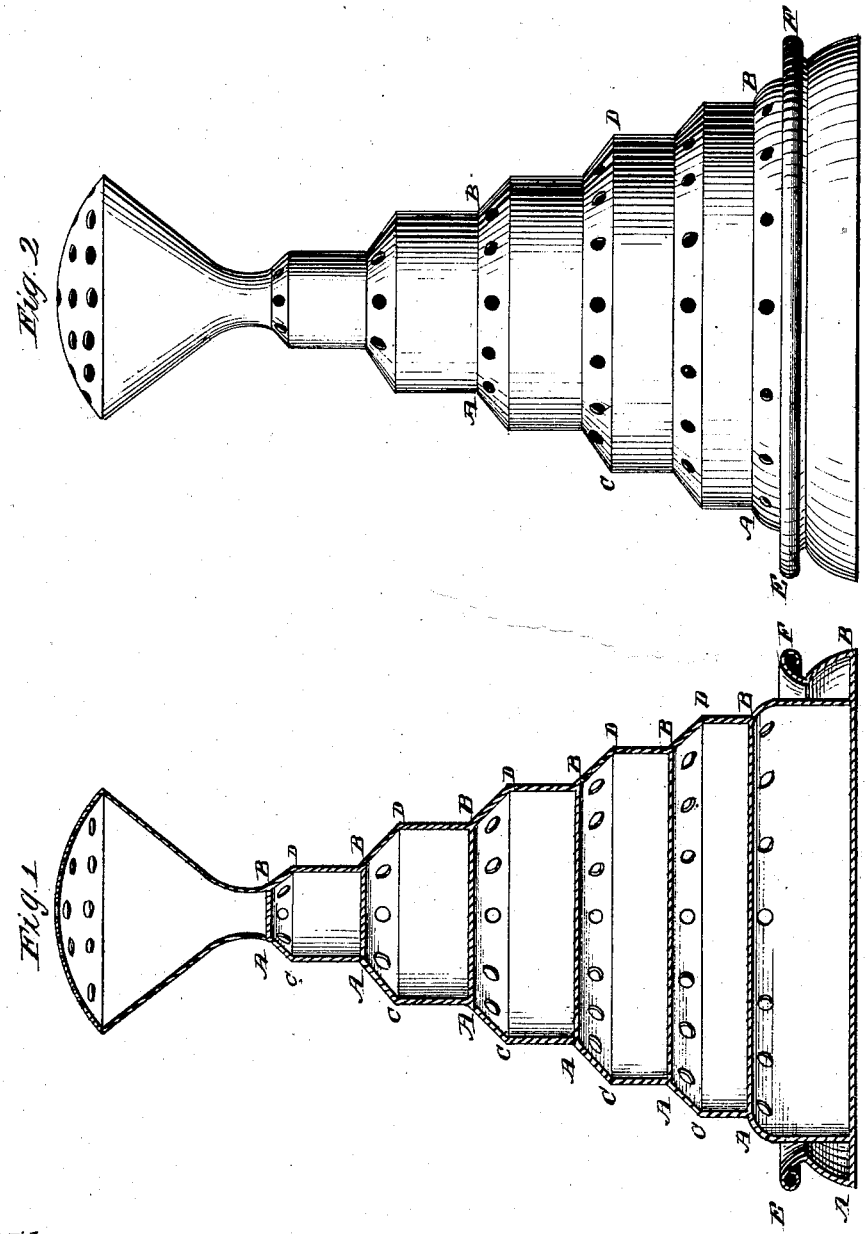
Witnesses:
John H. Stines
S Ellis Gladding
Inventor:
Samuel Van Stone

UNITED STATES PATENT OFFICE.

SAMUEL VANSTONE, OF PROVIDENCE, RHODE ISLAND.

IMPROVEMENT IN STANDS FOR FLOWERS.

Specification forming part of Letters Patent No. 165,456, dated July 13, 1875; application filed September 9, 1874.

*To all whom it may concern:*

Be it known that I, SAMUEL VANSTONE, of the city and county of Providence, in the State of Rhode Island, have invented a certain Improved Stand for Flowers, of which the following is a specification:

The object of my invention is to furnish a holder or stand for flowers which will supply water for the stem of each flower when arranged in a pyramidal or other attractive form, and at the same time produce the same effect with a smaller quantity of flowers than is commonly required for a bouquet. It is almost impossible to form a bouquet in such a way that all the stems can be supplied with water from a vase or dish when the form is other than flat.

My invention for the purposes aforesaid consists in arranging in the desired form a series of water-vessels with perforated covers for receiving the stems of cut flowers, as hereinafter described.

One form is shown in the drawing.

Figure 1 is a vertical section. Fig. 2 is a view of the form ready for use. In Fig. 1, A B represent the bottom of the several compartments soldered to or fitted into the top of the one beneath it, and C D represent the water-line in the several compartments. E F represent a guard surrounding the base to catch water in the case of an overflow. The several compartments being filled with water the stems of the flowers are put through the perforations, as shown in Fig. 2, into the water, and are there held in place. When the stand is thus filled the flowers, though loosely placed, present the appearance of a compact bouquet of a form superior to those made by hand, while the water supplied to each stem insures the preservation of the flowers for the longest possible time.

What I claim as my invention, and desire to secure by Letters Patent, is—

A standard for cut flowers, consisting of a series of water-vessels with perforated covers for receiving the stems of the flowers arranged in pyramidal or similar form, substantially as described.

SAMUEL VANSTONE.

Witnesses:
  J. H. STINESS,
  L. ELLIS GLADDING.